United States Patent [19]

Sturm et al.

[11] Patent Number: 4,798,869
[45] Date of Patent: Jan. 17, 1989

[54] PROCESS FOR THE PRODUCTION OF THERMOPLASTIC COMPOSITIONS AND COMPOSITIONS PRODUCED THEREBY

[75] Inventors: Harald Sturm; Rolf-Walter Terwonne; Dieter Thunig, all of Marl, Fed. Rep. of Germany

[73] Assignee: Huels Aktiengesellschaft, Marl, Fed. Rep. of Germany

[21] Appl. No.: 927,985

[22] Filed: Nov. 7, 1986

[30] Foreign Application Priority Data

Nov. 7, 1985 [DE] Fed. Rep. of Germany ....... 3539414

[51] Int. Cl.$^4$ .................. C08F 265/04; C08F 267/06
[52] U.S. Cl. .................. 525/305; 525/317; 525/902
[58] Field of Search ........ 525/305, 317, 902

[56] References Cited

U.S. PATENT DOCUMENTS 3,763,279 10/1973 Kelly ............................... 525/86
4,670,509 6/1987 Aoyama et al. .................. 525/902

OTHER PUBLICATIONS

Brown et al., Chemistry, The Central Science, 2nd Edition, p. 708, 1981.
Martell and Calvin, Chemistry of the Metal Chelate Compounds, pp. 2 and 531–541.

Primary Examiner—Jacob Ziegler
Attorney, Agent, or Firm—Millen & White

[57] ABSTRACT

A process for the production of a thermoplastic composition for molded parts having improved impact resistance, transparency, surface gloss, and weatherability, and formed of a hard inner core of crosslinked polystyrene, a rubber-elastic intermediate layer of crosslinked polyacrylic ester, and an outer layer of polyvinyl chloride, wherein the inner core thereof is produced by the steps of:

(a) forming a mixture, before or after addition of an initiator, under polymerization conditions in the presence of an emulsifier, of 0.01–5.0% by weight of an acrylic acid or methacrylic acid aclkyl ester with a crosslinking component, and thereafter (b) adding to the mixture, 20–70% by weight of a mixture of an aromatic vinyl monomer with a crosslinking component and, simultaneously therewith in a separate stream, a solution of an organic complexing agent and of an emulsifier in water, and optionally a solution of a catalyst, and emulsion polymerizing the resultant mixture;

wherein the intermediate layer thereof is produced by adding, to the inner core produced in step (b), (c) 79.99–25% by weight of a mixture of an acrylic acid alkyl ester with a crosslinking component and simultaneouly therewith an aqueous emulsifier solution, under emulsion polymerization conditions; and wherein the outer layer thereof is formed on the thus-produced core/shell polymer by adding, to 50 to 2 parts by weight thereof, (d) 50 to 98 parts by weight of vinyl chloride or a monomer mixture containing predominantly vinyl chloride, with agitation, and in the presence of an initiator, the agitating temperature and period selected so that the conversion, based on the monomer mixture or, respectively, the vinyl chloride, is at most 10% by weight, and thereafter continuing the polymerization by heating to the polymerization temperature, to a vinyl chloride conversion of 65–95%.

21 Claims, No Drawings

PROCESS FOR THE PRODUCTION OF THERMOPLASTIC COMPOSITIONS AND COMPOSITIONS PRODUCED THEREBY

BACKGROUND OF THE INVENTION

This invention relates to processes for the production of thermoplastic compositions based on vinyl chloride polymers and polymers for impact resistance modification as well as thermoplastic molding compositions produced thereby which exhibit, in addition to high impact resistance and good surface gloss, high transparency and weatherability.

Polyvinyl chloride (PVC) is a synthetic resin widely utilized because of its good properties and favorable price. When PVC is employed alone, it exhibits high transparency, but inadequate impact strength. In order to improve impact strenth, vinyl chloride polymers are treated with a great variety of modifiers. Examples include polymeric modifying agents of the butadiene type, such as acrylonitrile-butadiene-styrene (ABS) and methyl methacrylate-butadiene-styrene (MBS); copolymers of ethylene with vinyl acetate (EVA); chlorinated polyolefins, such as chlorinated polyethylene (CPE); ethylene-propylene rubbers and polymers of the acrylate type, such as homo- and copolymers of acrylic acid alkyl esters. However, although these modifiers do increase impact resistance, they greatly impair, depending on the type of modifier employed, other desirable properties of PVC, e.g., transparency or weatherability.

Consequently, there have been many attempts to increase the impact resistance of polyvinyl chloride without impairing the other properties mentioned above.

U.S. Pat. No. 3,763,279 (DOS No. 2,222,876), which disclosure is incorporated by reference herein, discloses the production of multiple-layer polymers exhibiting a hard inner core (e.g., crosslinked polystyrene, index of refraction higher than that of PVC) and a rubber-elastic outer layer (e.g., a crosslinked acrylic ester polymer; index of refraction smaller than that of PVC). The composition of the core/shell polymer must be chosen in correspondence with the desired properties. For high transparency, the styrene proportion should be about 55%, and for high impact resistance below 50%. Manufacture takes place in two successive emulsion polymerizations. In a third step, covering polymerization with vinyl chloride in emulsion or suspension is employed. However, the resultant molding compositions exhibit, however, a poor surface gloss and hazy portions. Moreover, the use of a styrene seed latex is required.

According to the patent, special conditions must be observed during production. The disclosure mentions th necessity of destroying the catalyst residues and driving out the unpolymerized monomers, after production of the polystyrene seed latex, as well as after the first covering polymerization with acrylic acid ester. This avoids the formation of new particles in subsequent stages since they decrease transparency. These intermediate steps, however, are time and energy consuming. The grain obtained after the covering polymerization with vinyl chloride is non-porous. In order to circumvent ensuing difficulties during drying, it is recommended to mix the suspension with a modifier-free PVC suspension and process them together. However, without high porosity, ready devolatizing ability and thus economically advantageous and physiologically harmless production and further processing, and use of the vinyl chloride polymers (EP No. 0 033 893) is not attained. Also the resultant polymers do not demonomerize at lower temperatures. The ability to demonomerize at lower temperature results in less thermal damage to the vinyl chloride polymer.

DAS No. 2,557,828, corresponding to Canadian No. 1,063,285, describes the production of a modifier in powder form for use in impact-resistant and transparent molding compositions based on vinyl chloride polymers.

In the first stage, a mixture of an aromatic vinyl monomer is polymerized with a crosslinking agent, and this polymer is covered, in a second stage, by a mixture of an acrylic acid alkyl ester with a crosslinking agent by polymerization. In a third stage, methyl methacrylate and an aromatic vinyl monmer are then applied by polymerization onto the polymer obtained in the second stage. All polymerization stages are performed in emulsion. The multiple-layer polymer is coagulated by salting out and is washed, dryed, and preferably pulverized. This pulverized multiple-layer polymer is incorporated into polyvinyl chloride with the optional addition of customary auxiliary agents.

In this patent, the showing is made, with the aid of examples, that a direct covering polymerization of vinyl chloride onto the modifier obtained in the second stage leads to products having markedly poorer properties. Furthermore, the isolation of the modifier is accompanied by additional work and a burdening of the wastewaters with salt.

However, contrary to the teachings of this patent, direct grafting has been found desirable, since improved binding of the modifier particles to the PVC matrix is achieved thereby.

Also, in such a case, no hard shell material (which material does not contribute toward improvement of the mechanical properties) is introduced into the vinyl chloride polymer.

OBJECTS OF THE INVENTION

It is an object of the invention to provide a process for the production of a vinyl chloride polymer molding composition having high transparency and impact resistance and good surface gloss, and which is resistant to the effects of weathering.

It is another object to provide an improved vinyl chloride molding composition produced by such a process.

Upon further study of the specification and appended claims, further objects and advantages of this invention will become apparent to those skilled in the art.

SUMMARY OF THE INVENTION

In a method aspect, this invention relates to a process for the production of a thermoplastic composition for molded parts having improved impact resistance, transparency, surface gloss, and weatherability and formed of a hard inner core of crosslinked polystyrene, a rubber-elastic intermediate layer of crosslinked polyacrylic ester, and an outer layer of polyvinyl chloride,
  wherein the inner core thereof is produced by the steps of:
    (a) forming a mixture, before or after addition of an initiator, under polymerization conditions in the presence of an emulsifier, of 0.01–5.0% by weight of an acrylic acid or methacrylic acid alkyl ester with a crosslinking component, and thereafter (b) adding to the mixture, 20–70% by weight of a mixture of an aromatic vinyl monomer with a crosslinking component and, simultaneously therewith in a separate stream, a solution of an organic complexing agent and of an emulsifier in water, and optionally a solution of a catalyst, and emulsion polymerizing the resultant mixture;

wherein the intermediate layer thereof is produced by adding, to the inner core produced in step (b), (c) 79.99–25% by weight of a mixture of an acrylic acid alkyl ester with a crosslinking component and simultaneously therewith an aqueous emulsifier solution, under emulsion polymerization conditions; and wherein the outer layer thereof is formed on the thus-produced core/shell polymer by adding, to 50 to 2 parts by weight thereof, (d) 50 to 98 parts by weight of vinyl chloride or a monomer mixture containing predominantly vinyl chloride, with agitation, and in the presence of an initiator, the agitating temperature and period selected so that the conversion, based on the monomer mixture or, respectively, the vinyl chloride, is at most 10% by weight, and thereafter continuing the polymerization by heating to the polymerization temperature, to a vinyl chloride conversion of 65–95%.

In a composition aspect, this invention relates to thermoplastic molding compositions produced by such a process comprising a hard inner core of crosslinked aromatic vinyl polymer; an intermediate layer of crosslinked polyacrylic ester; and an outer layer of polyvinyl chloride.

DETAILED DISCUSSION

A process has now been discovered for the production of thermoplastic compositions for molded parts having improved impact resistance, transparency, surface gloss, and weatherability, made up of a hard inner core of crosslinked polystyrene, a rubbery-elastic intermediate layer of crosslinked polyacrylate, and an outer layer of polyvinyl chloride, characterized in that th'ere is added, to (I) 50 to 2 parts by weight, preferably 45 to 2 parts by weight, of a core-shell polymer, prepared by polymerization in emulsion in the presence of water-soluble or oil-soluble initiators wherein (a) there is provided, before or after addition of the initiator, under polymerization conditions in the presence of an emulsifier, 0.01–5.0% by weight of a mixture of an acrylic acid or methacrylic acid alkyl ester with a crosslinking component, and thereafter (b) there is added, batchwise or continuously, 20–70% by weight of a mixture of an aromatic vinyl monomer with a crosslinking component and simultaneously therewith, in a separate stream, a solution of an organic complexing agent and of an emulsifier in water, and optionally a solution of a catalyst, and the polymerization is performed, and there is added to this polymer, batchwise or continuously, (c) 79.99–25% by weight of a mixture of an acrylic acid alkyl ester with a crosslinking component and simultaneously therewith an aqueous emulsifier solution, under polymerization conditions, (II) 50 to 98 parts by weight, preferably 55 to 98 parts by weight, of vinyl chloride or a monomer mixture containing predominantly vinyl chloride, and agitation is conducted in the presence of the initiator, the agitating temperature (preferably 20°–50° C.) and period (preferably 0.5 to 2 hours) to be selected so that the conversion, based on vinyl chloride, is at most 10%, whereupon the polymerization is continued, by heating to the polymerization temperature, up to a vinyl chloride conversion of 65–95%, preferably 75–90%.

As used herein, "core/shell polymer" refers to the product resulting from stage I above. Such products include a core of crosslinked polymerized aromatic vinyl monomers and an outer (shell) layer of a crosslinked rubbery-elastic polyacrylic ester. This outer layer becomes the intermediate layer of the final product.

The polymer of the aromatic vinyl monomer utilized in the first step preferably has a glass transition temperature of $>25°$ C., preferably $>40°$ C. The polymer of the acrylic acid alkyl ester utilized in the second stage has a glass transition temperature of $\leq -20°$ C. As crosslinking components in the first and second polymerization stages, compounds are suitably employed having at least 2 unconjugated double bonds in amounts of about 0.1–7.0% by weight, preferably about 0.2–5.0% by weight, based on monomer to be crosslinked.

The refractive index of the core/shell polymer, i.e., the coated-core polymer particles comprising a core and an intermediate shell should be equal to that of polyvinyl chloride.

The first stage of the polymerization takes place in an aqueous medium in the presence of an emulsifier or an emulsifier mixture. At the reaction temperature, e.g., from 40° to 90° C., preferably from 40° to 85° C. as stated below, prior to or after adding the initiator, a small amount of a methacrylic acid ester or acrylic acid ester with crosslinking agent is added, in the presence of an emulsifier, in order to improve the particle size adjustment.

Polymerization is started during addition of the little amount of (meth)acrylate, to the initiator, provided in the reaction mixture, or vice versa.

This seems to be important for the particle size adjustment, for, with a given amount of emulsifier, the particle size is depending on the amount of added (meth)acrylate. The particle size is decreasing with increasing amount of (meth)acrylate.

Without this prereaction of (meth)acrylate the particle size of the latex particles is not constant.

By addition the initiator first and than the (meth)acrylate, smaller coated-core particles are obtained and vice versa.

Thereafter, the aromatic vinyl monomer, forming the hard core, and the crosslinking agent are added. Simultaneously with the aromatic vinyl monomer, in a separate stream, an aqueous solution of the emulsifier and of an organic complexing agent is added thereto. These additions can take place continuously or batchwise. It is also possible to add a portion at the beginning of the reaction and the remainder during the course of the polymerization.

Preferably the aromatic monomer as well as the aqueous solution of the emulsifier are added in a continuous and constant stream over the whole period. However addition of the emulsifier solution relative to the increase of the latex-particles, resp. their surface tension, is possible. Addition of the emulsifier solution should be terminated when the addition of the monomer is finished or sooner.

By addition of the organic complexing agent during polymerization, an improvement in polymerization rate is achieved, accompanied by lower residual monomer contents and improved emulsion stability.

The complexing agent is added dissolved in the aqueous solution of the emusifier.

The shell-forming acrylic monomer is added continuously or batchwise in admixture with the crosslinking agent after the end of the first stage and optionally after a post reaction period of 15–180 minutes, i.e., about 15–180 minutes after the metering of the aromatic vinyl monomer is substantially complete. At the same time, an emulsifier solution is added. Water-soluble or oil-soluble initiators can be utilized. Water-soluble intiators are added with the emulsifier solution and oil-soluble initiators are added together with the monomer, as described more fully below.

The shell-forming acrylic monomer and the aqueous emulsifier solution are added in the same manner as described for the aromatic monomer.

In both stages, the addition and the amount of the monomers, of the emulsifier, and of the initiator should be such that formation of new particles during the course of polymerization is effectively suppressed once polymerization is initiated. Therefore, the surface tension should be maintained somewhat above the critical micelle concentration, as described more fully below. Particle formation should take place solely in the initial phase of polymerization, e.g., phase I(a), above. Therefore, the utilization of oil-soluble initiators is preferred.

On the core-shell polymer resulting from stage I, above, vinyl chloride is applied by polymerization in a third stage corresponding to stage II, above.

In the third stage the vinyl chloride can be grafted onto the core/shell polymer while the system is subjected to either emulsion or suspension conditions. For this purpose, the latex suspension of core/shell polymer is preferably introduced into an aqueous supension medium, e.g., a solution containing the initiator and, if necessary, additives, such as organic complexing agents, buffers, as well as optional additional polymerization aids. Such polymerization aids are well known to those skilled in the art. After removal of the oxygen, vinyl chloride is introduced under pressure and the mixture is heated to a temperature of between 20° and 50° C., preferably between 25° and 50° C. At this temperature, the mixture is agitated for 30 minutes to 2 hours. During this step, the conversion by polymerization that takes place must be at most up to 10.0% by weight, preferably not more than 8%. After elapse of this time period, the mixture is heated up to the polymerization temperature of 35°–75° C., preferably from 40° to 75° C. Conversion rates higher than 10% generally decrease the capability of breaking up these proportions, and this becomes recognizable by gel formation. Agitating periods of less than 30 minutes lead to poorer reproducibility of the suspension polymerization; periods longer than 2 hours do not afford advantages but rather merely bring an increase in cycle time. The polymerization temperature and thus the type and amount of initiator should be selected in accordance with the desired K-value (according to Pikentscher, DIN 53 726).

The "K-value" is a characteristic data especially for a vinyl chloride polymer characterizing the average degree of polymerization.

The pressure at which the agitation and polymerization stages take place is the saturation pressure corresponding to the polymerization temperature, until at the end of the polymerization the usual pressure drop takes place.

The agitation temperature and period should be such so that the primary portion of monomers is converted only at the polymerization temperature.

The resultant polymer is freed of the main quantity of water by conventional physical methods, such as, for example, centrifuging or vacuum filtering, and is dried, for example, in a fluidized-bed dryer. The average grain diameter is 80–150 $\mu$m. Processing takes place according to conventional methods, such as, for example, by means of extruders, injection-molding machines, etc. At this stage, if desired, customary stabilizers, plasticizers, colorants, and processing aids are added. Such additions are well known to those skilled in the art.

If an emulsion polymerization method is selected for the third stage, vinyl chloride and optionally additional emulsifier and initiator, as well as further conventional polymerizing aids are added, and the remainder of the procedure is as described above. Isolation is then effected, for example, by spray-drying.

Aromatic vinyl monomers that can be employed for the core include, for example, styrene, vinyltoluene, $\alpha$-methylstyrene, chlorostyrene, bromostyrene, etc., i.e, those which form polymers having a glass transition temperature of $\geq 25°$ C., preferably $>40°$ C. DIN 7742) and an index of refraction larger than that of polyvinyl chloride (nd=1.537). Suitable acrylic acid esters are those of 2–10 carbon atoms in the alkyl chain, the polymers of which exhibit a glass transition temperature of $<-20°$ C. and an index of refraction smaller than that of polyvinyl chloride, such as, for example, ethyl acrylate, n-butyl acrylate, isobutyl acrylate, n-octyl acrylate, 2-ethylhexyl acrylate, etc. Those of 4–8 carbon atoms are especially preferred, such as, for example, n-butyl acrylate, isobutyl acrylate, n-octyl acrylate, 2-ethylhexyl acrylate, etc.

Methacrylic acid alkyl esters suitable for use in the preliminary stage (i.e., I(a) above) are those of 1–18 carbon atoms in the alkyl chain, e.g., methyl methacrylate, etc. These monomers can be utilized alone as well as in admixture with each other.

Furthermore, it is possible to use up to 20% by weight of monomers copolymerizable with the above-mentioned compounds, such as, for example, vinyl esters, vinyl ethers, acrylo- or methacrylonitrile, alkyl esters of maleic acid, fumaric acid, or itaconic acid, olefins, etc.

Suitable crosslinking agents in the first and second stages, i.e., stage I, are compounds copolymerizable with the respective monomers and containing at least two unconjugated double bonds, such as, for example, divinylbenzene, (meth)acrylic acid vinyl esters, (meth)acrylic acid allyl esters, the diallyl esters of phthalic acid, maleic acid, etc., triallyl cyanurate, the (meth)acrylates of polyhydric alcohols, such as, for example, of pentaerythritol, trimethylolpropane, butanediol, ethanediol, glycerol, etc., triacrylamide or trimethacrylamide, etc.

The crosslinking agents should be utilized in both stages of the emulsion polymerization in amounts of 0.1–7.0% by weight, preferably 0.2–5.0% by weight, based on the monomer to be crosslinked. The outstanding mechanical properties of the molding compositions of this invention are achieved if the core as well as the shell (i.e., the intermediate layer of the final product) of the emulsion polymer are crosslinked.

As stated above, the surface tension of the mixture in both the first and second stages, i.e., stages I(b) and I(c) above, should be maintained above the critical micelle concentration. Thus, the addition and amount of monomers, emulsifiers and initiators should be such that formation of new particles during the course of polymerization is essentially suppressed.

Increasing of the rate of emulsifier provided effects an increased number of particles and therefore decreasing of particle size. Amounts of emulsifier from 0.1 to 2.0% by weight, preferably 0.15 to 1.5% by weight, relative to the organic phase, are provided. The total amount of emulsifier is, as will be described later on, 0.20 to 5.0% by weight, relative to the organic phase.

Conventional surfactants can be utilized as the emulsifiers in both stages of producing the core/shell polymer as well as optionally in the third stage (vinyl chloride polymerization). Customary anionic emulsifiers are particular advantageous, such as, for example, sodium laurate, sodium lauryl sulfonate, sodium lauryl sulfate, sodium alkyl benzenesulfonates, etc. They are added, depending on the type and on the particle size desired, in amounts from 0.20 part by weight to 5.0 parts by weight, based on the organic phase. In the first two stages, amounts are preferred at which core/shell polymers are obtained having an average diameter of 50 nm to 500 nm, i.e., amounts of 0.30 to 2.5% by weight, based on the organic phase. Within this range, excellent transparency and impact resistance are obtained even with low amounts of modifier. Additionally, nonionic tensides can also be added, such as, for example, fatty alcohol ethoxylates, fatty acid esters of polyethylene oxides, fatty acid esters of polyols, etc., in quantities of 0.05–1.5 parts by weight, based on the weight of the monomers utilized. In general, the greater the concentration of emulsifier in comparison with monomer present, the smaller the particle size. In general, the greater the concentration of monomer present in the system, the greater the particle size.

Suitable organic complex-forming agents used in the first stage include: alkali and ammonium salts of ethylenediaminetetraacetic acid or nitrilotriacetic acid, 1,2- and 1,3-propylenediaminetetraacetic acid, diethylenetriaminepentaacetic acid and their derivatives in the form of the free acids or salts, such as, for example, sodium N-oxethylethylenediaminetriacetate, sodium N-isopropanolethylenediaminetriacetate, sodium N-oxethyldiethylenetriaminetetraacetate, or sodium o-diaminocyclohexanetetraacetate. The organic complexing agents should be present in concentrations of from 0.05 to 1.8% by weight, preferably from 0.1 to 1.5% by weight.

Examples of suitable initiators in emulsion polymerization are water-soluble compounds of the peroxide type, such as, for example, potassium, sodium, or ammonium persulfates, tert-butyl hydroperoxide, hydrogen peroxide, etc. These initiators can be used by themselves or in admixture with each other in amounts of 0.01–1.0% by weight (based on the total amount of organic phase), preferably from 0.05 to 0.85% by weight optionally in the presence of 0.01–1.0% by weight of one or several compounds having a reducing effect and capable of forming redox catalyst systems, such as, e.g., aldehyde sulfoxylates, hyposulfites, pyrosulfites, sulfites, thiosulfates, etc.

Oil-soluble catalysts, such as, for example, azobisisobutyronitrile, also can be utilized in the emulsion polymerization (in the first, second and optionally third stages). These catalysts have the great advantage of causing less formation of new particles during the course of the polymerization than water-soluble catalysts, such as, e.g., persulfates. These catalysts are employed in concentrations of from 0.05 to 1.5% by weight, preferably from 0.10 to 1.2% by weight. In general, the polymerization is conducted at temperatures of between 40° C. and 90° C., in case of redox catalyst systems also at lower temperatures.

The temperature of the system at the preliminary stage (phase I(a) above) should be from about 40° to 90° C., preferably from about 40° to 85° C. The temperature of the system during the polymerization of the aromatic vinyl monomer should be maintained from 40° to 90° C., preferably from 40° to 85° C. The temperature of the system during the polymerization of the shell-forming acrylic monomer should be maintained from 40° to 90° C.

The covering polymerization, i.e., applying vinyl chloride onto the core/shell polymer (third stage), takes place preferably in suspension, but if desired also in emulsion. It is possible to admix with the vinyl chloride up to 20% by weight of copolymerizable monomers, such as, for example, vinyl ethers, vinyl esters, such as vinyl acetate, propionate, butyrate, haloganted vinvyl compounds, such as vinyl fluoride, vinylidene chloride, unsaturated acids and their anhydrides, such as maleic, fumaric, acrylic acid, their mono- and diesters, as well as maleic anhydride.

Primary protective colloids can be added as the suspension agents, in amounts of 0.05% by weight to 1.05 by weight (based on the total amount of the organic phase). Examples include the extensively water-soluble cellulose derivatives having viscosities of a 2% aqueous solution of 25–3,000 mPa.s, such as alkyl, hydroxyalkyl, alkylhydroxyalkyl, and carboxyalkyl celluloses, polyvinyl alcohols, partially saponified, water-soluble polyvinyl acetates, copolymers of vinylpyrrolidone and ethylenically unsaturated esters, polyoxazolines, etc.

Additionally, nonionic tensides can be added, such as, for example, fatty acid ethoxylates, fatty acid esters of polyols, alcohol ethoxylates, and similar compounds, in amounts of 0.01–1.2 parts by weight, based on the total amount of organic phase, to act as suspension agents.

The suspension polymerization is initiated by monomer-soluble radical initiators, e.g., of the peroxide type, or azo compounds. Examples of peroxidic initiators are diacyl peroxides, dialkyl peroxides, peroxydicarbonates, alkyl peresters, etc., such as bis(2-methylbenzoyl) peroxide, di-tert-butyl peroxide, dilauroyl peroxide, acetylbenzoyl peroxide, dicumyl peroxide, dicetyl peroxydicarbonate, tert-butyl perpivalate, and similar compounds, as well as, for azo initiators, azobisisobutyronitrile. The type and quantity of the initiator employed are chosen according to methods well known to those skilled in the art. It is also possible to employ initiator mixtures.

Further additions for the suspension polymerization include buffers and/or an organic complexing agent, such as, for example, ethylenediaminetetraacetic acid as well as the salts thereof, nitrilotriacetic acid and the salts thereof, etc., in amounts of 0.01 up to respectively 0.5 part by weight, based on the organic phase. As a result, the bulk density (DIN 53 468) and the reproducibility (for example particle size distribution according to DIN 53 734) are improved, with the plasticizer absorption (DIN 53 417) and the average grain diameter remaining the same.

The coated-core polymer exhibits a diameter from 50 nm to 500 nm, whereas the core (being crosslinked polymer from aromatic monomer) can have a diameter from 20 to 445 nm.

The final product, received after the covering polymerization of vinyl chloride, exhibits an average diameter from 80–150 μm.

By alteration of the suspension system these average diameters can be enlarged or diminished.

The weight content of coated-core polymer in the final obtained polymer amounts between 2 and 50% by weight.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLE 1

(A) Preparation of a Latex According to the Invention 100 parts of fully demineralized water is combined with 0.85 part of sodium laurateas the emulsifier. The mixture is heated up to 80° C. and, once a clear solution has been obtained, combined with 0.5 part of an n-butyl acrylate/diallyl phthalate mixture (99:1). After 10 minutes, 0.20 part of ammonium persulfate is added and, after another 10 minutes, metered feeding is started of 57.0 parts of a styrene/divinylbenzene mixture (99:1) and 115 parts of an emulsifier/ethylenediaminetetraacetic acid tetrasodium salt solution. The emulsifier/EDTA solution consists of 0.425 part of sodium laurate, 1.0 part of EDTA, and 113.575 parts of FD water. Dosing is continued over a period of 2 hours; after a post reaction time of 30 minutes, the residual styrene content is 0.2% (conversion >99% by weight). Then, at likewise 80° C., 42.5 parts of a butyl acrylate/diallyl phthalate mixture (99:1) and 85 parts of a mixture of 0.293 part of sodium laurate and 0.130 part of ammonium persulfate in 84.577 parts of FD water are fed in metered amounts within 3 hours. The mixture is allowed to continue in a post reaction for another hour. The average particle diameter is 95 nm. The residual monomer content was determined to be 0.1% by weight (conversion >99% by weight).

(B) Vinyl Chloride Graft Polymerization onto Latex (A)

A solution of 0.20 part of a methylhydroxypropylcellulose (viscosity of the 2% aqueous solution=50 mPa.s) in 120 parts of FD water is combined with 0.08 part of azobisisobutyronitrile, 0.06 part of EDTA, 40 parts of latex (A) (corresponding to 10 parts of solid matter), and, after repeated evacuation and purging with nitrogen, 90 parts of VC.

The mixture is heated to 40° C., stirred for one hour, heated to the reaction temperature of 60° C., and allowed to react up to a pressure of 3 bar. A VC conversion of about 4% as determined during the agitating phase by means of the difference in temperature between the polymerization medium and the jacket. The polymer is freed of residual monomer by expansion, suctioned off, and dried in a fluidized-bed dryer. A suspension polymer is obtained having an average particle size of 90 μm, a powder density of 590 g/l, and a plasticizer absorption (DIN 53 417) of 7.9 g DOP/100 g PVC.

EXAMPLE 2

A latex is prepared as described in Example 1(A), except that azobisisobutyronitrile (AIBN) is utilized as the initiator in place of ammonium persulfate. In the first stage (production of core), AIBN (0.20 part) is provided with the aqueous emulsifier solution and, in the second stage (covering polymerization of the shell), it is provided in a solution with butyl acrylate (0.13 part of AIBN). Suspension polymerization is performed as in 1(B). A vinyl chloride polymer is obtained having a powder density of 620 g/l and a plasticizer absorption of 6.3 g DOP/100 g PVC.

EXAMPLE 3

The process of Example 1 is performed, with the exception of using AIBN (as described in Example 2) as the initiator during the emulsion polymerization. In the suspension polymerization, 32 parts of latex (corresponding to 8 parts of solid matter) and 92 parts of vinyl chloride are employed.

Comparative Example I

The process of Example 1 is carried out, except that, in stage B, after filling the reactor, the mixture is immediately heated up to polymerization temperature. A coarse polymer is obtained plugging the outlet pipe connection of the polymerization reactor.

Comparative Example II (According to U.S. Pat. No. 3,763,279)

The process is conducted as described in Example 2 of U.S. Pat. No. 3,763,279, with the exceptions that a polystyrene proportion is present in the core/shell polymer of 57% and that the polymerization reactor is charged, during the subsequent VC covering polymerization, with 10 parts of latex (calculated as solid matter) and 90 parts of VC together with the polymerization aids. A polymer is obtained having an average grain diameter of 200 μm and a plasticizer absorption of 0.4 g DOP/100 g PVC.

Comparative Example III (Without Complexing Agent)

The procedure of Example 1(A) is performed, except that, during production of the core, an emulsifier solution without EDTA addition was gradually fed in metered amounts, and the EDTA was charged into the reactor. The conversion rate after the first stage was merely 93% and, after the second stage of the emulsion polymerization, only 95%, based on the monomer utilized (residual styrene content <0.05%), as compared with 99% in both stages when EDTA is fed in dosed amounts. A suspension polymer is obtained having an average grain diameter of 350 μm and a plasticizer absorption of 0.8 g DOP/100 g PVC.

Comparative Example IV

A polybutyl acrylate latex is produced, onto which is grafted vinyl chloride. The size of the polybutyl acrylate particles is 90 nm. The suspension polymer has an average particle size of 110 μm.

Comparative Example V

This polymer is a commercially available bulk PVC of Hüls AG ("VESTOLIT" M 6058).

Production of the Test Specimens 100 parts of the vinyl chloride polymer is combined with 2.5 parts of a commercially available tin stabilizer, UV stabilizer, and lubricant, and the mixture is heated in a laboratory hot mixer to 110° C. Thereafter the polymer is processed into rolled sheets on a mixing roll at 175° C., and the sheets are processed into pressed plates. The notch impact resistance is determined according to DIN 53 453, and transmission is measured with a spectrophotometer by General Electric on 2 mm thick plates against $BaSO_4$.

TABLE 1

| Test Example | Core/Shell Polymer St % | Core/Shell Polymer BA % | VC Graft Polymer Elastomer Phase % | Notch Impact Resistance kJ/m² | Transmission % at nm 500 | 600 | 700 nm |
|---|---|---|---|---|---|---|---|
| 1 | 57 | 43 | 4.8 | 30 | 80 | 85 | 87 |
| 2 | 57 | 43 | 4.8 | 32 | 80 | 85 | 87 |
| 3 | 58 | 42 | 3.7 | 22 | 82 | 87 | 89 |
| I (Comp)* | 57 | 43 | | | | | |
| II (Comp)** | 57 | 43 | 4.8 | 8 | 67 | 70 | 78 |
| III (Comp)** | 57 | 43 | 4.8 | 6 | 72 | 83 | 84 |
| IV (Comp)** | 0 | 100 | 6.5 | 40 | 18 | 33 | 43 |
| V (Comp)** | 0 | 0 | 0 | 2 | 82 | 87 | 89 |

*Material is not broken up on the roll.
**The polymer showed poor absorption of additives and plasticized only gradually.

It can be seen from Table 1 that the molding compositions of this invention exhibit properties which represent an optimum. The transmission values are the same as those of bulk polyvinyl chloride, but the latter shows a very low notch impact resistance, and the notch impact resistance values are approximately the same as in case of the polymer modified with a pure polybutyl acrylate (Comparative Example IV), but the latter is not transparent. It should be kept in mind that in the products modified with a core/shell polymer, the proportion of the rubber-elastic phase is less than 5.0% by weight, but in Comparative Example IV this value is 6.5% by weight.

Comparative Example I demonstrates the advantage residing in an agitated phase. Efforts of producing a readily processable grain failed. Thereby suffer transparency as well as notch impact resistance of the system. The same holds true when proceeding in accordance with U.S. Pat. No. 3,763,279 (Comparative Example II) or in case EDTA is not added gradually in metered amounts and the conversion rates in both stages of emulsion polymerization are too low (Comparative Example III). An extensive reduction is observed in transmission values as well as in notch impact resistance, which greatly restricts the possibilities of utilization.

EXAMPLE 4

The process of Example 2 is conducted, with the exception that the ratio of core to shell is 56 to 44. The polymerization temperature is varied during VC graft polymerization. The polymers are processed as described above.

TABLE 2

| Test Example | $T_{Pol}$ °C. | Notch Impact Resistance kJ/m² | Transmission % at nm 500 | 600 | 700 |
|---|---|---|---|---|---|
| 4(a) | 67 | 31 | 78 | 84 | 86 |
| 4(b) | 65 | 35 | 78 | 85 | 86 |
| 4(c) | 63 | 38 | 78 | 85 | 87 |
| 4(d) | 61 | 39 | 79 | 86 | 87 |
| 4(e) | 59 | 41 | 78 | 85 | 86 |
| 4(f) | 57 | 42 | 79 | 85 | 87 |

With rising polymerization temperature during graft polymerization of vinyl chloride onto the core/shell particles, a lowering a in notch impact resistance is observed. The transmission values remain constant within usual limits.

EXAMPLE 5

Example 2 is performed, except that the ratio of polystyrene core to polybutyl acrylate shell is changed. The processing of the vinyl chloride polymers takes place as described above.

TABLE 3

| Test Example | Core/Shell Polymer St % | Core/Shell Polymer BA % | VC Graft Polymer Notch Impact Resistance kJ/m² | Transmission % at nm 500 | 600 | 700 |
|---|---|---|---|---|---|---|
| 5(a) | 56 | 44 | 34 | 79 | 85 | 86 |
| 5(b) | 59 | 41 | 37 | 81 | 87 | 88 |
| 5(c) | 62 | 38 | 34 | 79 | 87 | 89 |
| 5(d) | 65 | 35 | 37 | 74 | 86 | 89 |
| V (Comparison) | 0 | 0 | 2 | 82 | 87 | 89 |

It can be seen that the molding compositions exhibit the most advantageous properties with a styrene content of 59%. Besides a very high light transmission, an unexpectedly high notch impact resistance is also found. There is only about 4.5% elastomer phase present. For attaining a notch impact resistance of such magnitude, it is otherwise necessary to provide about 6–7 parts of a crosslinked polyacrylic acid alkyl ester, such as, for example, polybutyl acrylate. Therefore, the compositions of this invention afford a greatly improved elastomer exploitation.

EXAMPLE 6

The process of Example 5 was carried out, with the exception that 32 parts of latex (corresponding to 8 parts of modifier) and 92 parts of vinyl chloride are utilized.

TABLE 4

| Test Example | Core/Shell Polymer St % | Core/Shell Polymer BA % | VC Graft Polymer Notch Impact Resistance kJ/m² | Transmission % at nm 500 | 600 | 700 |
|---|---|---|---|---|---|---|
| 6(a) | 56 | 44 | 20 | 81.0 | 82.5 | 87.0 |
| 6(b) | 57 | 43 | 19 | 81.5 | 86.0 | 87.5 |
| 6(c) | 58 | 42 | 22 | 82.0 | 87.0 | 88.5 |
| 6(d) | 59 | 41 | 27 | 82.0 | 87.5 | 89.0 |
| 6(e) | 60 | 40 | 24 | 81.0 | 86.5 | 88.5 |
| 6(f) | 61 | 39 | 18 | 81.0 | 86.5 | 89.0 |
| 6(g) | 62 | 38 | 16 | 81.5 | 87.0 | 88.0 |
| V (Comparison) | 0 | 0 | 2 | 82.0 | 87.0 | 89.0 |

As compared to the 0-sample (B-PVC), it can be seen that, with a styrene proportion in the core/shell polymer of 59%, light transmission reaches the highest possible value, namely that of pure bulk polyvinyl chloride. The molding compositions herein exhibit a surprisingly high impact resistance. It was unexpected that the result would be a molding composition based on vinyl chloride polymer which exhibits such an excellent array of properties.

EXAMPLE 7

The molding composition from Example 2 is processed on an extruder with a slotted die into plates having a thickness of 4.0 mm. The mass temperature is varied between 180° and 195° C. From the workpieces, test specimens are made for determining notched impact strength. For determination of the transmission values, pressed plates having a thickness of 2 mm are produced.

COMPARATIVE EXAMPLE VI

A commercially available PVC modified with chlorinated polyethylene is utilized and processed as described in Example 7.

COMPARATIVE EXAMPLE VII

A commercially available bulk vinyl chloride polymer is used ("VESTOLIT" M 6058 of Hüls AG) and ( processed as disclosed in Example 7.

COMPARATIVE EXAMPLE VIII

A polymer is employed obtained according to the teaching in DAS No. 2,557,828, and processed as set forth in Example 7.

COMPARATIVE EXAMPLE IX

Six parts of a commercially available impact resistance modifier based on methacrylic acid methyl ester-butadiene-styrene and 94 parts of B-PVC are combined as described above with the usual additives and mixed together. Processing takes place as described in Example 7.

TABLE 5

| Test Example | Core/Shell Polymer St % | Core/Shell Polymer BA % | Mass Temperature °C. (Extruder) | Notch Impact Resistance kJ/m² | Surface[1] | Transmission % at 500 | 600 | 700 nm |
|---|---|---|---|---|---|---|---|---|
| 7 (a) | 57 | 43 | 180 | 38 | 1–2 | 80 | 87 | 88 |
| 7 (b) | | | 185 | 35 | 1 | 81 | 87 | 88 |
| 7 (c) | | | 190 | 34 | 1 | 81 | 87 | 88 |
| 7 (d) | | | 195 | 41 | 1 | 81 | 87 | 88 |
| VI (Comp) | CPE Modified | | | | | | | |
| (a) | | | 180 | 8 | 1–2 | 70 | 77 | 81 |
| (b) | | | 190 | 9 | 1–2 | 72 | 78 | 82 |
| (c) | | | 195 | 8 | 1–2 | 72 | 78 | 82 |
| VII (Comp) | Bulk PVC | | | | | | | |
| (a) | | | 180 | 2.5 | 1–2 | 82 | 87 | 89 |
| (b) | | | 190 | 2.9 | 1 | 82 | 87 | 89 |
| (c) | | | 195 | 2.8 | 1 | 82 | 87 | 89 |
| VIII (Comp) | 33.25 | 36.75[2] | | | | | | |
| (a) | | | 180 | 13 | 1–2 | 72 | 79 | 82 |
| (b) | | | 190 | 14 | 1–2 | 73 | 79 | 83 |
| (c) | | | 195 | 14 | 1–2 | 73 | 79 | 82 |
| IX (Comp) | MBS Modified | | | | | | | |
| (a) | | | 180 | 10 | 1–2 | 60 | 67 | 71 |
| (b) | | | 188 | 13 | 1–2 | 60 | 67 | 70 |
| (c) | | | 195 | 11 | 1–2 | 60 | 67 | 70 |

[1]1: glossy; 2: glossy with dull streaks; 3: dull
[2]These 70 parts of core/shell polymer are covered, in a second covering polymerization, first with 15 parts of MMA and then with 15 parts of styrene. The resultant modifier is produced and incorporated as described in DAS 2,557,828.

Table 5 shows clearly that only the vinyl chloride polymers according to this invention permit production of molding compositions which exhibit, besides high transmission, an excellent surface gloss and unexpectedly high notched impact resistances. With the use of CPE-modified polyvinyl chloride, the surfaces of the molding compositions are only somewhat lower in quality than those according to this invention, but the notch impact resistance as well as, above all, transparency, are markedly poorer. The same holds true for molding compositions based on a vinyl chloride polymer and a modifier prepared according to the teaching of DAS No. 2,557,829, or a modifier based on MBS. The molding compositions of Comparative Examples VI and VIII additionally show marked dulling, and the molding composition of Comparative Example IX has a somewhat slighter dulling.

The thermoplastic compositions obtained in accordance with this invention can be utilized, for example, for the manufacture of greenhouses.

The preceding examples can be repeated with similar success by substtuting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a thermoplastic composition for molded parts having improved impact resistance, transparency, surface gloss, and weatherability and formed of a hard inner core of crosslinked polystyrene, a rubber-elastic intermediate layer of crosslinked polyacrylic ester, and an outer layer of polyvinyl chloride, wherein the inner core thereof is produced by the steps of:

(a) forming a mixture, before or after addition of an initiator effective to initiate polymerization, under polymerization conditions in the presence of an emulsifier, of 0.01–5.0% by weight of an acrylic acid or methacrylic acid alkyl ester with a crosslinking component whereby polymerization is effected, and thereafter (b) adding to the mixture, 20–70% by weight of a mixture of an aromatic vinyl monomer with a crosslinking component and, simultaneously therewith in a separate stream, a solution of an organic complexing agent and of an emulsifier in water, and emulsion polymerizing the resultant mixture;

wherein the intermediate layer thereof is produced by adding, to the inner core produced in step (b), (c) 79.99–25% by weight of a mixture of an acrylic acid alkyl ester with a crosslinking component and simultaneously therewith an aqueous emulsifier solution, under emulsion polymerization conditions;

wherein said amounts in steps (a), (b) and (c) are based on the total amount of the composition resulting from said steps; and wherein the outer layer thereof is formed on the thus-produced core/shell polymer by adding, to 50 to 2 parts by weight thereof, (d) 50 to 98 parts by weight of vinyl chloride or a monomer mixture containing predominantly vinyl chloride, wherein the amounts of said core/shell polymer and said monomer or mixture of step (d) are based on the total amount thereof, with agitation, and in the presence of an initiator effective to initiate polymerization, the agitating temperature and period selected so that polymerization occurs with a conversion, based on the monomer mixture or, respectively, the vinyl chloride, up to 10% by weight, and thereafter continuing the polymerization by heating to the polymerization temperature, to a vinyl chloride conversion of 65–95%.

2. A process of claim 1, wherein in step (b) the vinyl monomer forms a polymer having a glass transition temperature of at least about 25° C. and an index of refraction larger than that of polyvinyl chloride.

3. A process of claim 2, wherein the vinyl monomer forms a polymer having a glass transition temperature greater than about 40° C. and an index of refraction larger than that of polyvinyl chloride.

4. A process of claim 1, wherein in steps (a)–(c) the crosslinking components contain at least two nonconjugated double bonds.

5. A process of claim 4, wherein the crosslinking component is present in an amount of from about 0.1–7.0% by weight, based on the monomer to be crosslinked.

6. A process of claim 5, wherein the crosslinking component is present in an amount of from 0.2–5.0% by weight, based on the monomer to be crosslinked.

7. A process of claim 1, wherein in step (b) the mixture of acrylic acid alkyl ester and crosslinking component is added batchwise.

8. A process of claim 1, wherein in step (b) the mixture of acrylic acid alkyl ester and crosslinking component is added continuously.

9. A process of claim 1, wherein in step (c) the mixture of acrylic acid alkyl ester and crosslinking component is added from about 15 to about 180 minutes after the completion of polymerization of the aromatic vinyl monomer in step (b).

10. A process of claim 1, wherein the core/shell polymer particles have an index of refraction equal to that of polyvinyl chloride.

11. A process of claim 1, wherein the initiators are oil soluble.

12. A process of claim 1, wherein the initiators are water soluble.

13. A process of claim 1, wherein the mixture of step (d) contains 45–2 parts by weight of the core/shell polymer particles.

14. A process of claim 1, wherein the mixture of step (d) contains about 55–98% of said vinyl chloride or vinyl chloride/monomer mixture.

15. A process of claim 1, wherein the vinyl chloride conversion in step (d) is about 75–90%.

16. A process of claim 1, wherein in step (d) the final polymerization temperature is about 35°–75° C.

17. A thermoplastic molding composition having high impact resistance, good surface gloss, high transparency and weatherability, produced by the process of claim 1.

18. A thermoplastic molding composition according to claim 17 whose inner core has a glass transition temperature of at least about 25° C. and an index of refraction greater than that of polyvinyl chloride;

whose intermediate layer has a glass transition temperature of less than −20° C. and an index of refraction smaller than that of polyvinyl chloride; and whose core and intermediate layer collectively have an index of refraction equal to polyvinyl chloride.

19. A thermoplastic molding composition according to claim 18, whose inner core polymer has a glass transition temperature greater than about 40° C.

20. A thermoplastic molding composition of claim 17, wherein the inner core is formed of polymerized styrene/divinylbenzene, the intermediate layer is formed of polymerized n-butyl acrylate and the outer layer is formed of polyvinyl chloride.

21. A process of claim 1, wherein step (b) is conducted with the addition of a catalyst effective to catalyze polymerization.

* * * * *